Feb. 23, 1965  J. M. WAGNER  3,170,390
APPARATUS FOR INCISING AND IMPRINTING INFORMATION
Filed March 29, 1962  4 Sheets-Sheet 1

INVENTOR.
JACK M. WAGNER
BY
Christie, Parker & Hale
ATTORNEYS.

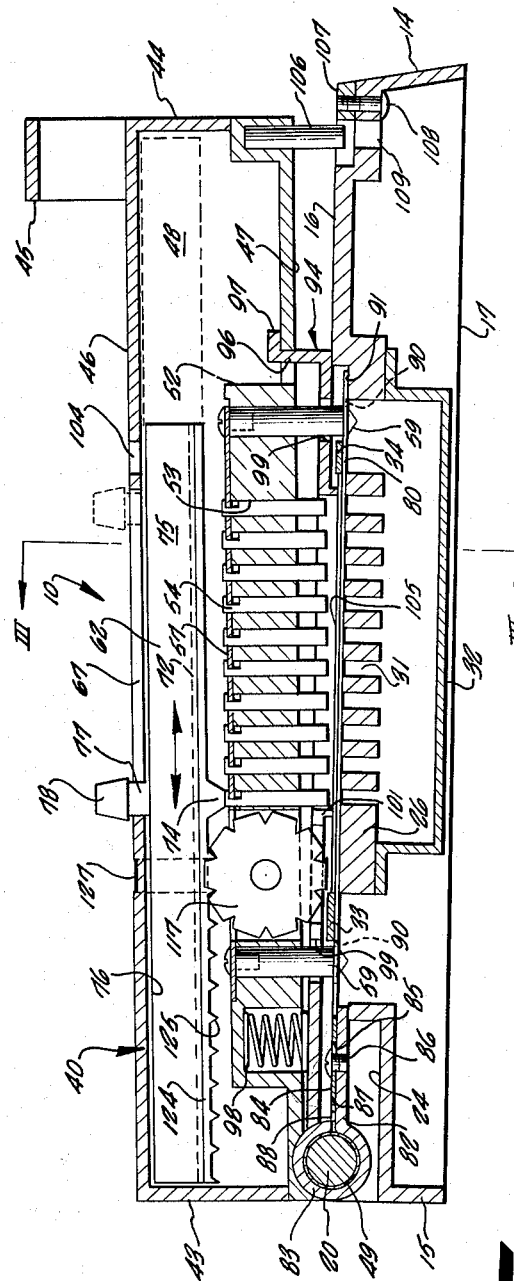
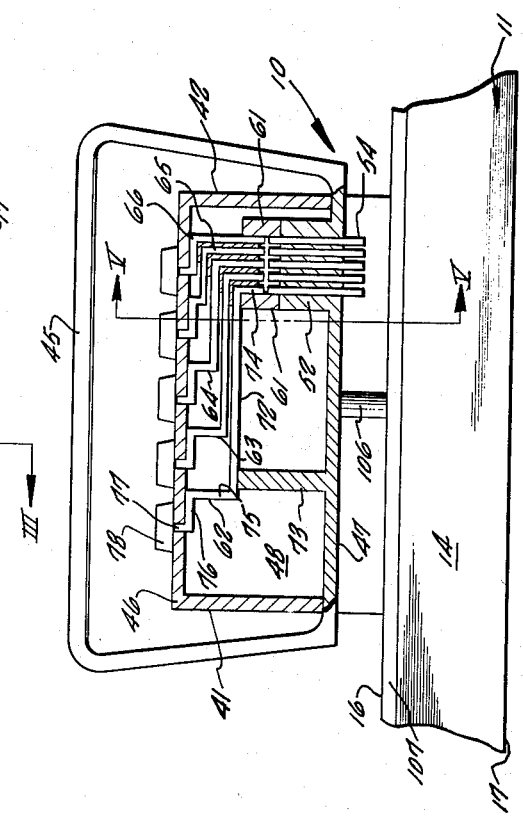

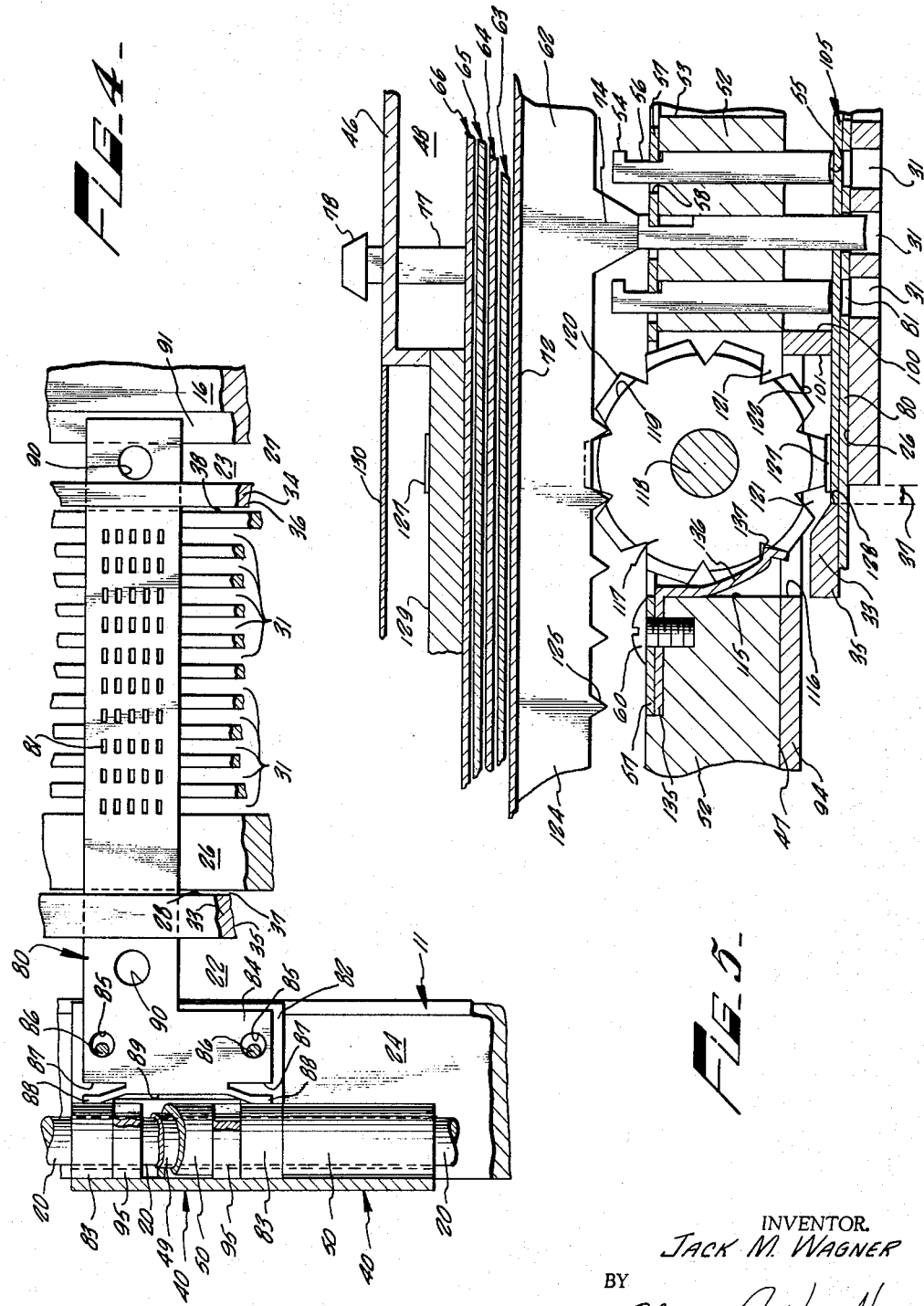

Feb. 23, 1965 J. M. WAGNER 3,170,390
APPARATUS FOR INCISING AND IMPRINTING INFORMATION
Filed March 29, 1962 4 Sheets-Sheet 4

INVENTOR.
JACK M. WAGNER
BY Christie, Parker & Hale
ATTORNEYS.

United States Patent Office 3,170,390
Patented Feb. 23, 1965

3,170,390
APPARATUS FOR INCISING AND IMPRINTING INFORMATION
Jack M. Wagner, 605 Santa Maria Road, Arcadia, Calif.
Filed Mar. 29, 1962, Ser. No. 183,550
17 Claims. (Cl. 101—19)

This invention relates to the devices for recording data on tubulating cards, invoice card sets, and the like. More particularly, it relates to devices for manually imprinting and incising coded digital data on a card in preselected fields of the card.

This application is a continuation-in-part of my application for United States Letters Patent titled "Apparatus for Incising and Imprinting Information," filed January 11, 1960, and bearing Serial No. 1,791, which issued October 23, 1962, as Patent No. 3,059,570.

The widespread use of punch cards in data processing systems throughout the United States has resulted in much activity in the art of punching and imprinting data on record or tabulating cards. Examples of such data processing systems are inventory control, quality control, and accounting procedures to name but a few. Many of these data processing systems, and the apparatus associated with such systems, are adapted for use of the IBM-type tabulating card wherein digital data is represented by holes punched into the card.

As an example of a data processing system in which this invention finds utility, a gasoline marketing operation is considered typical, but such an example should not be considered as limiting the scope of this invention. In a credit transaction at a neighborhood gas station, the customer usually tenders a plastic credit card which is embossed and/or incised with data identifying the particular customer. This credit card is a key to all transactions involving this individual. (If the credit card carries embossed and incised information, apparatus according to my prior patent application, Serial No. 1,791, may find utility in conjunction with the apparatus of this invention.) In present practice, the credit transaction requires that the customer identifying information be transferred from the credit card either by manually transcribing the information therefrom or by a semi-mechanical transfer through the use of well-known devices. The original record of the sale of gasoline, motor oil, or the like usually is transferred to a packet of tissue slips. The original from this packet of slips or forms is sent to a central clearinghouse and data processing station. At this point the information from the original sales record must be transcribed and transferred from the original record to an IBM-type tabulating card. This transfer requires that an operator working a keyboard-type machine read the information from the original record and punch this information into the conventional taubulating card. From this point on, the standard data processing apparatus can operate on the card since, at this point, the card bears data compatible with the logical processes of the various machines which subsequently will operate upon the card.

The machines which operate upon the punched data processing tabulating card will do only what humans instruct the machine to do. Generally, the logical or data handling units of a data processing system are programmed to take data from location A, to compare the information from location A with information derived from a second location B, and to operate upon the information from location A in accord with a predetermined instruction. Following such operation upon the information from source A, the resultant product is stored in location C in the logic or memory unit prior to read-out from the logical unit. For such a system, it is necessary that the digital data be located in a predetermined field or area of each card since the auxiliary machinery which operates upon the card is wired to scan predetermined areas of the card. For example, a collator, designed to sort cards from a stack into logical sequences or into groups of cards having common characteristics, is instructed to search a predetermined area of each card for the common or desired characteristic. Print-out machines transcribing the data from a punched card to a printed invoice or billing slip are further dependent on electromechanical reading or scanning of a predetermined area of the card.

If the original data-bearing incisions are to be made at a remote station, as for example at a gasoline station, it is necessary that the original information be incised into the card in locations consistent with the logical wiring of the machines which subsequently will handle such cards. This invention provides simple, effective and efficient apparatus for originally incising digital information into a tabulating card. The apparatus is simple and accurate in operation such that it may be used by personnel untrained in the intricacies of data processing methods, as for example by the operator of a neighborhood gasoline service station. The invention further provides apparatus which can be custom tailored to the particular accounting or data handling program of a particular data processing system, but the invention still provides means whereby the apparatus can be altered in its operation if the logical processes of the data handling system are altered or modified.

Generally speaking, this invention provides apparatus for incising and imprinting a blank with data. The apparatus comprises a base and a punch carriage. Means are mounted on the base so as to be engageable with the blank to locate the blank in a predetermined position relative to the base. A plurality of data punches are mounted in the punch carriage and are adapted to engage the blank. Die means cooperating with the punches, and underlying the blank when the blank is in its predetermined position relative to the base, are provided. The invention includes means in the punch carriage operable for selecting at least one of the plurality of punches for operation upon the prepositioned tabulating blank and for locking the selected punch into blank incising position. Further, the invention includes means connecting the punch carriage to the base for movement of the carriage toward and away from the base. Movement of the carriage toward the base brings the selected punch into incising engagement with a predetermined area of the blank.

Apparatus according to this invention may further include means operable in response to operation of the means for selecting at least one punch to imprint the blank with data corresponding in value to the punch selected by operation of the means for selecting at least one punch. In a preferred form of this invention the means for imprinting information comprises a printing wheel rotated in response to movement of an interposer bar operable to select a particular punch having a particular value. The invention further includes means engageable between the base and the punch carriage for aligning the carriage in a preselected location relative to the base whereby the preselected punch incises the blank at a particular location thereof. These means engageable between the base and the punch carriage include a slotted guide strip which is removable from the base so that a differently slotted guide strip may be inserted in the base. Such interchangeability of the guide strips provides that the apparatus of this invention may be utilized to punch data in different preselected fields in a tabulating card according to different logical processes associated with the machinery comprising a digital data processing installation.

Other features and objects of this invention will be more clearly understood by reference to the following detailed description and explanation of this invention taken in conjunction with the accompanying drawings wherein:

FIGURE 2 is a cross-sectional elevation view of the imprinter and incisor, taken in part along line II—II of FIGURE 1, illustrating the punches and the imprinter wheel;

FIGURE 3 is a cross-sectional elevation view taken along line III—III of FIGURE 2;

FIGURE 4 is a plan view, with parts broken away, of the die plate and hinge assembly for the punch carriage;

FIGURE 5 is an enlarged cross-sectional view of the imprinter wheel and interconnection with the interposer bars; and is taken along line V—V of FIGURE 3.

Figure 1:
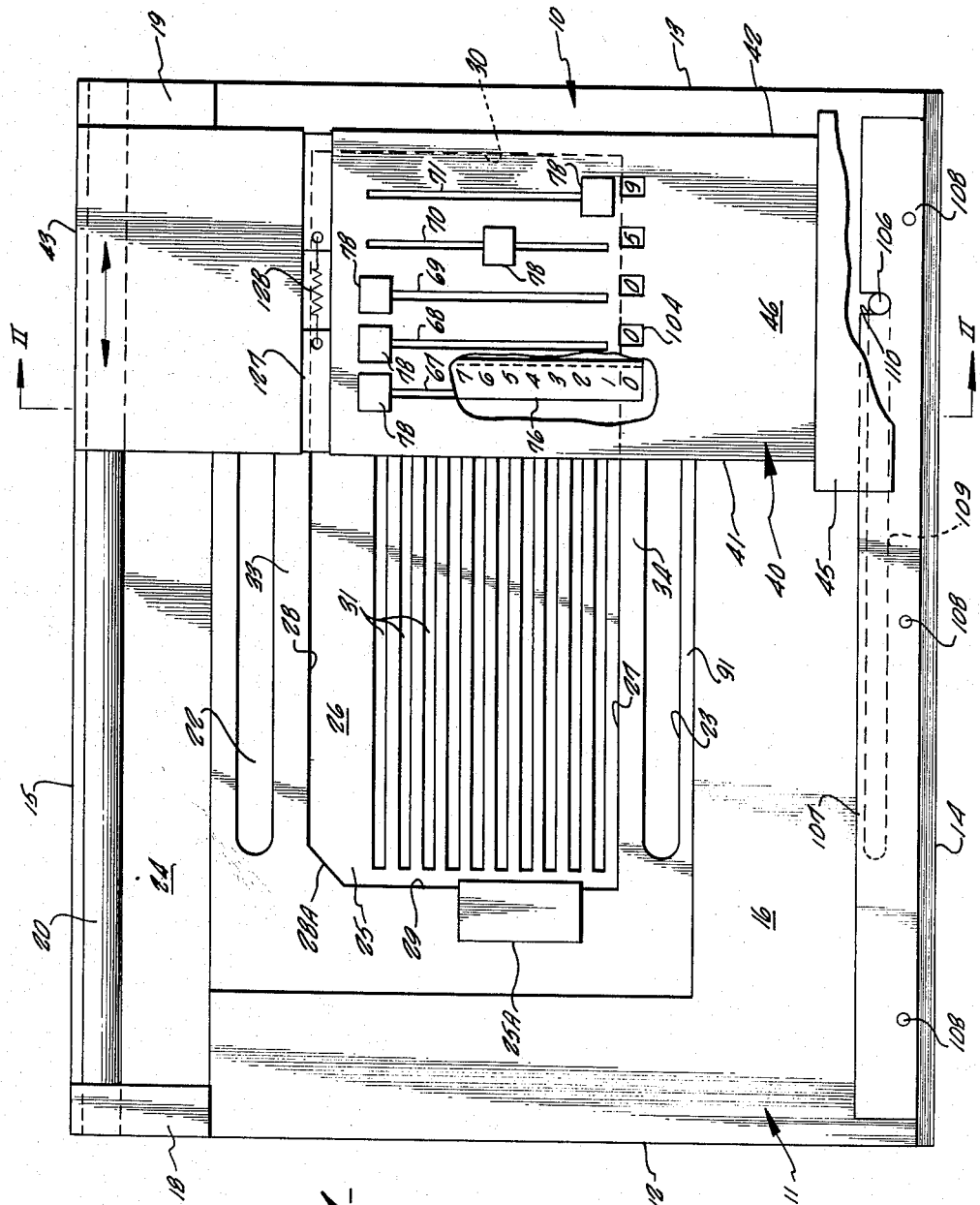
FIGURE 1 is a plan view, with portions partially broken away, of the data incisor and imprinter.

Referring to FIGURES 1, 2 and 4, an imprinter and incisor 10 according to this invention is illustrated. The incisor 10 includes an elongated base 11 having right and left sides 12 and 13, front and back sides 14 and 15, and substantially parallel top and bottom surfaces 16 and 17, respectively. Adjacent each of the rear corners of base 11, a hinge pedestal or lug 18 and 19, respectively, is raised from the upper surface 16. An elongated cylindrical hinge bar or pin 20 extends longitudinally of the base 11 between posts 18 and 19 and parallel to the rear 15 of the base 11. A pair of guide pin slots 22 and 23 extend longitudinally of the base 11 and are spaced apart transversely of one another with respect to base 11. The slots 22 and 23 extend through the base 11 as illustrated, but this function may be accomplished by recesses in base upper surface 16. The portion of the base 11 between lug hinge posts 18 and 19 may be recessed below the upper surface 16 of base 11 as illustrated in FIGURE 2 at 24, or the base 11 may be completely cut away such that the lugs 18 and 19 extend from the rearward portion of base 11.

Centrally of the base 11, and in the upper surface 16 thereof, a tabulating card positioning recess 25 is provided. The lower surface or base 26 of recess 25 is spaced below, but is parallel to, the upper surface 16 of base 11. Recess 25 is bounded by forward and rear sides 27 and 28, respectively, by corner 28A, and by ends 29 and 30. A plurality of longitudinally oriented slots 31 are formed in the base or bottom 26 of the tab card recess 25. Preferably there are ten such slots 31 extending from surface 26 through the base 11 to communicate with a punchings catch-pan 32 mounted within base 11. Slots 31 are oriented parallel to the axis of the hinge rod 20 and are spaced apart one from another on centers corresponding to the distances between the locations of the various digital bits in a column of an IBM-type tabulating card. A thumbhole or tab card grasping recess 25A is formed in base 11 adjacent the left end 29 of the tab card recess 25 and extends into the recess 25 so that, when a tab card is positioned in recess 25, the left end of the card overhangs recess 25A.

As illustrated in FIGURE 1 the tab card recess 25 is positioned between the longitudinal guide pin slots 22 and 23 and may be milled or cast directly into the upper surface 16 of base 11, but a preferred form of the invention is according to FIGURE 4. In FIGURE 4, the base 11 includes a pair of longitudinally oriented raised ribs 33 and 34 disposed between the guide post slots 22 and 23 and the tab card recess 25. Portion 33 defines the upper edge 28 of the tab card recess 25 and has an under surface 35 raised above surface 26 of recess 25. A slot 37 through base 11 separates recess 25 and portion 33 to facilitate casting of base 11. Similarly, the base portion 34 has an under surface 36 which is raised above surface 26 and is defined by a slot 38 through base 11 to facilitate casting of base 11. The slots 37 and 38 also facilitate movement of the die plate blank as will be described later. The upper surfaces of base portions 33 and 34 are coplanar and are disposed below and parallel to base surface 16.

A punch carriage 40 is mounted for movement longitudinally of the base 11. As illustrated in FIGURES 1, 2 and 3, the punch carriage 40 has vertical sidewalls 41 and 42, a rear end 43, and a front end 44 at which an upstanding looped handle 45 is provided. Punch carriage 40 also has parallel upper and lower surfaces 46 and 47, respectively. The interior of punch carriage 40 defines a cavity 48 of substantially the same configuration as punch carriage 40.

Lid or punch carriage 40 is hinged to the hinge bar 20 by a plurality of spaced apart hinged lugs or pintles 50 formed (as shown in FIGURE 4) by two spaced apart strips depending from the rear of carriage 40 and which are wrapped around a journal bearing sleeve 49 slidably mounted concentric to hinge bar 20. The punch carriage 40 is so mounted to hinge bar 20 that it is both hingeably rotatable of hinge bar 20 and axially slidable relative to the hinge bar. Alternatively, lugs 50 may be formed by boring holes in a cast or extruded member.

A substantially rectangular punch guide block 52 is provided in the cavity 48 in conjunction with the bottom wall 47 of punch carriage 40. Ideally, the punch guide block 52 is oriented longitudinally of the punch carriage 40 transversely of base 11. A plurality of vertically oriented slots or apertures 53 are provided in guide block 52 and extend completely through the guide block into communication with the under surface 47 of punch carriage 40. As illustrated in FIGURES 2 and 3 there are fifty such apertures 53 arranged transversely of the punch carriage in ten rows and longitudinally of punch carriage 40 in five columns. These apertures or slots 53 have spacings between the columns consistent with the spacings between the columns of digital data bit locations on a typical IBM tab card. Similarly, the spacing between the separate slots 53 in each column corresponds to the spacing between the horizontal rows of digital data bit locations on an IBM card.

An elongated, rectangularly cross-sectioned incising punch 54 is disposed in each of the slots 53. As more clearly illustrated in FIGURE 5, each punch 54 has an arcuate lower end 55 defining the incising or punch portion of each punch. A recess or notch 56 is formed in the punch 54 adjacent its upper end for engagement with a punch retainer plate 57. Punch retainer plate 57 has formed therein a plurality of slots or openings 58 corresponding to the number of punches 54 supported in the punch guide block 52. In fabrication of the imprinter and incisor 10, the punches 54 are disposed in slots 53 with punch notches 56 all aligned in the same direction. The punch retainer or keeper plate 57 is then engaged over the ends of the punches 54 and, when aligned with all of the notches 56, plate 57 is indexed relative to the punch guide block in a direction opposite to direction in which the notches 56 uniformly open. As illustrated in FIGURES 2 and 5, keeper plate 57 is displaced rearwardly of punch carriage 40 relative to punches 54. The punch retainer plate 57 is secured to the punch guide block 52 in conjunction with the die alignment pins 59 which will be described later. Alternatively, as illustrated in FIGURE 5, the retainer plate 57 may be secured directly to the guide block 52 by machine screws 60. Either of these methods of securing retainer plate 57 provides that the punches 54 are vertically reciprocable within punch guide block 52. The amount of reciprocation allowed is the difference between the length of the notches 56 and the thickness of the retainer plate 57. It is preferred that the amount of reciprocation of each punch be greater than the thickness of a tabulating card 105 which is to be punched in the machine.

A vertical flange 61 extends upwardly from each side of the punch guide block 52. These flanges 61 are spaced apart from one another and are disposed longitudinally of punch carriage 40 and function as retainers for a plurality of interposer bars 62–66. Interposer bars 62–66 are a part of the punch selector and imprinter wheel indexing mechanism. The number of interposer bars 62–66 corresponds to the number of columns of punches 54 supported in guide block 52. As illustrated in FIGURE 1 a plurality (five are illustrated) of longitudinal slots 67–71 are formed in the upper surface 46 of punch carriage 40. The spacing between each of these slots 67–71 is greater than the spacing between the columns of punches 54 in order that the manually engageable tabs or knobs 78 associated with each interposer 62–66 may be conveniently engaged.

Since all of the interposers are substantially the same, only interposer bar 62 will be described in detail. Interposer bar 62 is adapted to operate as a selector for the punches in the left-most column of punches illustrated in FIGURE 3 and as a lock for the punch selected. Interposer 62 has a first or major horizontal planar portion 72 extending substantially the length of the interposer. This portion 72 is engaged on the upper surface of the left-most flange 61 associated with punch guide block 52, and also rests upon the upper end of a flange or partition 73 which is raised from the bottom wall 47 of punch carriage 40. A downwardly extending tab portion 74 is provided at the right edge of the horizontal portions 72 substantially at the mid-length of interposer 62. To the left of the partition 73, the interposer 62 is bent upwardly and extends in a vertical portion 75 to substantially the underside of upper wall 46 of punch carriage 40. Adjacent the upper wall 46 the interposer is offset laterally in a portion 76 parallel to the major horizontal portion 72. Portion 76 extends away from portion 72. As viewed in FIGURE 3, an upwardly extending tab 77 is formed in horizontal portion 76 to extend through slot 67 in the punch carriage 40. A manually engageable nob or tab 78 is secured to tab 77 exteriorly of punch carriage 40. The others of the interposers 62–66 are configured substantially according to the configuration of interposer 62 except that on succeeding interposers 63–66 the first horizontal portion 72 and the vertical leg 75 are diminished as the offset distance between tab 77 and selector lug 74 decreases. Each of the subsequent interposers nest upon a friction reducing shim engaged between it and the interposers below. All interposers are constrained from movement transversely of punch carriage 40 by the flanges 61 and by the respective guide slots 67–71. Preferably each of the interposers 62–66 is fabricated from sheet metal. The mounting of the interposers described above provides that the interposers are movable longitudinally of the punch carriage 40 and transversely of base 11.

A die plate 80 is mounted to the punch carriage 40 at hinge bar 20 as illustrated in FIGURES 2 and 4. The die plate 80 is a thin metallic sheet member having perforations 81 corresponding in number and configuration to the plurality of punches 54 supported in the punch guide block 52. The die plate 80 is secured to a hinged bracket 82 secured to hinge bar 20 by a pair of spaced apart lugs or pintles 83 which are fabricated in the form of extensions of the plate 82 rolled around the journal sleeve 49. These lugs 83 are straddle one of the pintles 50 of punch carriage 40. The lugs 83 may be bored as mentioned above. The configuration of the die plate 80 is an elongate strip having a transverse extension portion 84 adjacent the rear end thereof. A pair of apertures 85 are provided in this rear portion of the die plate 80 for engagement with retainer pins 86 affixed to the die hinge plate 82. The diameter of pins 86 is substantially less than the diameter of apertures 85 in which these pins cooperate. A pair of spaced apart recesses or notches 87 are formed in the sides of the rear portion of die plate 80 so as to define thin fingers 88 between notches 87 and the extreme rear edge 89 of die plate 80. Fingers 88 are sprung rearwardly of die plate 80 and engage the hinge knuckles or pintles 83 of the die hinge plate. This spring loaded engagement of the fingers 88 urges the die plate 80 forwardly of the hinge plate 82 such that the retainer pins 86 engage apertures 85 at the rear-most extent of the apertures when the die plate is in its normal relaxed position. A pair of guide apertures 90 are formed at opposite ends of the strip portion of the die plate over the guide pin slots 22 and 23, respectively. Apertures 90 cooperate with the punch carriage guide pins 59. Guide pins 59 may also serve as a means for securing the punch retainer plate 57 in the manner described above. The guide pins 59 are tapered or cut away at their lower ends to accommodate rotation of the punch carriage 40 relative to die plate 80.

As illustrated in FIGURE 2, as the punch carriage 40 is hinged about the hinge bar into closure relation with base 11, the guide pins 59 engage in the guide apertures 90 of die plate 80. Continued hinging motion of the punch carriage causes displacement of the die plate 80 rearwardly toward hinge bar 20 as guide pins 59 bias against the rearward limits of apertures 90. The spring loaded action of fingers 88 against the die plate hinge pintles 83 assures that snug cooperation occurs between the guide pins 59 and die plate 80 to maintain exact positioning of the die plate apertures 81 under the punches 54 and over the slots 31 formed in the base of the tabulating card recess 25. It is preferred that the width of the slots 31 be slightly greater than the maximum extent of the die plate apertures 81. The configuration of the die plate apertures 81 conform substantially to the cross-section of punches 54.

The die plate 80 passes under the base portions 33 and 34 below the under surfaces 35 and 36, respectively, and over surface 26 defining the bottom of the tabulating card recess 25. The end of the die plate 80 remote from hinge bar 20 is engaged in a groove or a recess forwardly of guide pin slot 23 having bottom surface 91. Surface 91 is coplanar with tabulating card recess surface 26. Since base portions 33 and 34 overlie the die plate 80, the die plate is maintained in a substantially horizontal position when the punch carriage 40 is hinged relative to the base 11. When a tabulating card is engaged in the recess 25, the card overlies the die plate 80. Sliding movement of the punch carriage 40 along hinge bar 20 results in the die plate 80 being moved longitudinally of the base 11 within tabulating card recess 25 even when a card 105 is disposed in recess 25.

A stripper plate 94 is provided as a part of the punch carriage 40. The stripper plate is substantially planar and has planar lugs 91 which are wrapped around the hinge bushing journal 49 to define hinge knuckles 95 for the stripper plate. Knuckles 95 bracket the same pintle 50 of the punch carriage as is straddled by the spaced apart hinge knuckles 83 of the die hinge plate 82. A vertical extension 96, extending through an aperture 99 provided in the underside of punch carriage 40 just forwardly of the punch guide block 52, is provided at the forward or unhinged end of stripper plate 94. A forwardly extending lug 97 is connected to stripper plate portion 96 and engages the upper side of the lower wall 47 of punch carriage 40. This engagement between lug 97 and wall 47 provides that as punch carriage 40 is hinged relative to hinge bar 20 the stripper plate 94 also is hinged upwardly. The distance between the lug 97 and the stripper plate proper 94 and the thickness of punch carriage bottom wall 47 provides for relative angular movement between the punch carriage 40 and the stripper plate 94. A compression spring 98 is mounted between the stripper plate 94 and the punch carriage 40 to urge the lug 97 into engagement with the punch carriage lower wall 47; the function of spring 98 will be described subsequently in greater detail. A pair of apertures 99 are provided in the stripper plate 94 in longitudinally spaced apart locations for cooperation with the die plate guide pins 59. A central opening 100 through stripper 94 having a depending flange 101 peripherally thereof is formed in the portion of the die plate adjacent the incising punches 54.

A conventional IBM-type tabulating card may accommodate either 80 or 53 columns of coded information. Each column corresponds to the location for the representation of a bit of digital information. Each bit is represented by one or two holes punched in the card at predetermined locations. To represent a numerical value in a given column, a hole is punched in the proper location in that column. Progressing from the top of each column, each successive location represents a value of 0, 1, 2, 3, 4, 5, 6, 7, 8, and 9. Since the tab card recess 25 is configured to locate the upper edge of the card toward the rear of the base 11, progressing from the rear part of the punch carriage 40 successive punches in each column represents 0, 1, 2, 3, 4, 5, 6, 7, 8, and 9. This invention includes means for indicating the value of the data bit being incised into the tabulating card by one of the punches 54. In part, such indicating means include visually observable means as a part of the interposers 62–66. A rectangular aperture 104 is provided adjacent the forward end of each of the slots 67–71 provided in the upper surface 46 of the punch carriage (see FIGURES 1 and 2) to expose a portion of the second horizontal section 76 of the interposer bars 62–66. On the upper surface of this horizontal section 76, a series of numbers running from zero (0) through nine (9) are engraved, stencilled or otherwise provided (see FIGURE 1). These numbers commence with zero adjacent the forward end of the interposer and proceed rearwardly. The spacing between the numbers corresponds to the spacing between each of the punches 54 in a particular column of the punches supported in the punch carriage 40. As the manually engageable knob 76 is engaged and the interposer is operated to select a particular punch, the value of the particular punch selected and locked into incising position by interposer lug 74 is observable through aperture or window 104. In this manner the operator of the incisor and imprinter 10 has a convenient means of setting the desired numerical value to be punched.

When the desired numerical value has been preset into the incising portion of the imprinter and incisor 10, closure of the punch carriage 40 relative to base 11 results in incising of a tabulating card 105 prepositioned in tab card recess 25. If it is assumed that the punch carriage 40 is hinged away from the base 11 in its initial condition, as the punch carriage 40 is hinged about hinge bar 20 into closure condition, initial contact between the punch carriage 40 and the base 11 occurs between the stripper plate 94 and the base 11 at that portion of base surface 16 adjacent recessed surface 91 (see FIGURE 2). In this condition the force of spring 98 is sufficient to maintain the punch carriage in the position illustrated in FIGURE 2 since the spring reaction is downwardly against the stripper plate and the base. In this condition all of the punches, whether selected or not, are in the maximum downward position. The lengths of the punches are such that the lower ends of the punches 54 are above the lowermost limit of the flange 101 peripherally of the stripper plate opening 100. The clearance between the punches 54 and the underside of flange 101, however, is less than the clearance provided between stripper plate 94 and the lower wall 47 of punch carriage 40. Therefore, continued depression of punch carriage 40 against the action of spring 98 brings each of the punches 54 into contact with the upper surface of the tabulating card 105. Those punches which are not selected by the predetermined position of the interposers 62–66 are free to move vertically in the punch guide block 52 as they engage the tabulating card 105. Such upward motion of the unselected punches through the punch guide block 52 would continue until the lower extents of the notches 56 engage the punch to retainer plate 57, but before this occurs stripper plate 94 engages the punch carriage 40 and the lower ends of the selected punches pass through tabulating card 105 to incise the desired data into card 105 (see FIGURE 5). Those punches which are selected by the predetermined positions of the interposers 62–66 are constrained from vertical movement through the punch guide block 52 and are forced through the tab card 105 to incise the tabulating card as inferred immediately above. In order for this to be accomplished, the relative clearances afforded by the length of the punch notches 56 and by the initial clearance between the lower end of the punches and the tab card when lug 94 engages the upper surface of the lower portion 47 of the punch carriage must be predetermined. As downward pressure, applied to the punch carriage 40 at handle 45, is released, spring 98 causes the punch carriage to be angularly displaced relative to the stripper plate 94. As this occurs, the lowermost rim of stripper plate flange 101 pushes the card 105 away from the selected punches so that the card is, in effect, stripped from the punches. The particles of fiberboard or paper produced by the incising operation on the tab card fall downwardly through the slots 31 of base 11 into the punchings catch-bin 32.

The data reading portions of the machinery of a data processing installation are extremely sensitive to the proper positioning of apertures or holes representing data in a tabulating card. Accordingly, in order that this invention have significant utility, it is necessary that the location of the punched holes in the tabulating card 105 be exactly in alignment with the hypothetical grid or data matrix to which conventional tabulating cards conform. If data representing holes deviate from the positions defined by this grid, then the brushes in the reading portions of the data processing machinery will read "no signal." If the holes are misaligned, then an inadequate signal will be read such that the resultant improperly generated electrical impulse may be rejected by checking circuits during passage through the logical portions of the data processor; the result is the same as if no signal were sensed. Inaccurate results necessarily will be obtained.

In order to properly assure the desired alignment between the group of punches 54 and the preselected field or area of the tabulating card 105 upon or in which the holes corresponding to certain preselected punches will occur, a downwardly extending positioning dowel or pin 106 is provided in the underside of the punch carriage 40 centrally of the forward portion of the punch carriage (see FIGURES 1, 2 and 3). This guide dowel 106 cooperates with a guide or selector blade 107 mounted to the forward portion of the incisor and imprinter base 11. Blade 107 preferably is in the form of a steel strip or flat bar secured to the base 11 by a series of machine screws 108. A slot or recess 109 is provided longitudinally of base 11 under the blade 107. This slot or recess 109 accommodates the dowel pin 106 when the dowel pin passes through a slot or notch 110 provided in the guide blade 107. The notch 110 has a width longitudinally of the blade 107 such as to provide relatively tight clearance with the diameter of the guide dowel 106. The notch 110 is milled or formed in blade 107 at a precisely preselected location. The location of notch 107 is accurately determined to correspond to the location of the particular columns of card 105 in which data is to be registered. The blade 107 is secured to the base 11 in a similarly precisely located position. In this manner the notch 110 is located in a preselected orientation relative to the base 11 and more particularly, in a preselected orientation relative to the longitudinal extent of the tabulating card recess 25. When the guide dowel is aligned with the notch 110, the recess or slot 109 below the blade permits the dowel 109 to move downwardly through the notch 110 such that complete closure relation between the punch carriage 40 and the base 11 may be achieved. If the punch carriage is improperly located relative to the base 11, then there is misalignment between dowel 106 and notch 110 such that the closure relation cannot occur; accordingly, there will be no punching of the tabulating card 105 positioned in the recess 25.

The notch 110 is positioned in the blade 107 at a location consistent with the functional wiring scheme of the various data processing machines which will operate on cards incised by the user of the incisor and imprinter 10. As pointed out in the introduction to this description, most data processing systems rely upon digital data being incised into tabulating cards in preselected fields or areas in the card. The machinery which operates upon these cards must read the data from the card according to a preselected functional or logical wiring system preset into such auxiliary data processing machinery. It is therefore necessary that information be punched into the card in those fields which will be scanned by the data processing machinery. Preselecting the location of the notch 110 relative to the longitudinal extent of the blade 107 assures that the punch carriage 40 will be properly positioned relative to the tab card 105 so that any apertures incised into the tabulating card must necessarily be in the proper positions in the card.

The removability of the blade 107 from the base 11 provides for custom tailoring of a mass produced article. The basic inciser 10 may find utility in conjunction with many widely differing programs of different data processing systems. It is only necessary to ascertain which fields of the tabulating cards used by a particular customer must be punched. When this is determined, one or more control slots or notches 110 are formed in guide blade corresponding to these particular fields. If it is contemplated that a particular user of the imprinter and inciser 10 may require that the imprinter and incisor 10 be used in conjunction with several different programs, then a notched control or guide blade 110 for each program may be kept on hand.

This invention further provides a means for imprinting upon the tabulating card the values corresponding to the apertures punched in the tabulating card by the selected punches 54. Referring to FIGURE 2, and to FIGURE 5 which is an enlarged illustration of a portion of FIGURE 2, an aperture or well 115 is provided through the punch guide block 52 adjacent the rearmost extent of the group of punches 54. Similarly, an aperture or hole 116 is provided through the stripper plate 94 in alignment with the printer wheel well 115. A plurality of imprinter wheels 117 are mounted in well 115 for rotational motion about a shaft 118 aligned parallel to the axis of the hinge bar 20. The number of imprinting wheels 117 corresponds to the number of columns of punches in the group of punches 54. Each imprinter wheel 117 has first and second peripheries 119 and 120. A number of notches 121, corresponding to the number of punches in each column of punches 54, are regularly spaced around each imprinter wheel 117 and extend from the outer periphery 120 within the inner periphery 119. Notches 121 define a corresponding plurality of radial sectors or feet 122 in each imprinter wheel. Engraved on the second periphery of each imprinter wheel and between the notches 121 is a numeral. If there are ten punches in each column of punches in the punch carrier 40, then there are ten radial feet or sectors 122 on each imprinter wheel. Each of the feet is engraved along the outer periphery 120 with a different number taken sequentially from the group of numbers 0, 1, 2, 3, 4, 5, 6, 7, 8, and 9.

Each of the interposers 62–66 has a vertical flange portion 124 extending downwardly from the right end of each of the major horizontal portions 72. It is from this flange 124 that the lug 74 functioning as the punch selector anl lock extends. Between the rearmost end of each of the interposers 62–66 and the lugs 74, and along the lower-most extremity of the flange 124, a plurality of teeth 125 are provided. Teeth 125 are spaced apart from one another consistent with the spacing between the notches 121 as measured along the circumference of the first periphery 119 of each of the imprinter wheels 117. As illustrated in FIGURE 5, the interposer flange portion 124 extends to intermediate the first and second peripheries 119 and 120 of the imprinter wheels 117. The teeth 125 are engageable in the lower-most extremities of the notches 121 inwardly of the first periphery 119. As an interposer bar is slid longitudinally of the punch carriage 40 (by operation through the means of one of the knobs 78) the teeth 125 on that interposer engage the adjacent imprinter wheel 117 and cause rotation of that imprinter wheel.

The diameter of the imprinter wheels is such that the lower-most portion of the second periphery of each wheel projects through the aperture 116 in the stripper plate into engagement with a carbon ribbon or printing medium carrier 127 provided peripherally of the punch carriage 40. As illustrated in FIGURE 1, the ribbon 127 has spaced apart ends joined together under tension at the upper portion of the punch carriage 40 by a tension spring 128. As most clearly illustrated in FIGURE 5, however, the ribbon 127 preferably lies in a recess 129 formed at the rear portion of the upper surface 46 of the punch carriage 40. Recess 129, and the ribbon 127 and spring tension mechanism 128 associated with the ribbon, preferably are covered by a sheet metal slide cover 130 engageable with punch carriage 40 from the rear end of the punch carriage. The cover 130 extends around the opposite vertical sides 41 and 42 of the punch carriage so as to completely protect the ribbon 127 and to prevent the accumulation of dust or dirt thereon.

The axis of the imprinter wheel shaft 118 and the ribbon 127 are so positioned relative to the axis 31 of the hinge bar 20 so that the ribbon 127 and the imprinter wheels 117 lie over the rearmost extent of a tabulating card 105 positioned in the card recess 25. It should be remembered that the upper portion of the tabulating card 25 is disposed toward the rear of the imprinter and incisor 10.

As the interposer bars are moved to select the proper ones of the punches 54, the various imprinter wheels 117 are also rotated. If in a particular column of punches the second punch 54 from the rear of the punch carriage is selected (a punch corresponding to the digital value 1) the associated printer wheel disposed substantially in line with this column is rotated so that the numeral 1 carried on the proper radial foot 122 is brought into alignment with the carbon or ink ribbon 127. Then upon closure of the punch carriage 40 relative to the base 11, an aperture having a value of 1 is punched in the tabulating card and the number one (1) is imprinted along the upper end edge of the tabulating card.

In order to assure that the movable portions of the imprinter and incisor selector mechanism maintain the positions associated with a number set into the machine, a spring detent is provided in conjunction with each pair of interposers and imprinter wheels. As illustrated in FIGURE 5 a comb plate 135 having a plurality of spring fingers 136 is mounted between the punch guide block 52, and the punch retainer plate 57 rearwardly of the printer wheel well or recess 115. Comb 135 is secured relative to the punch guide block 52 by the machine screw 60. Preferably each spring finger 136 has a dimpled portion 137 engageable in the portions of the notches 121 between the first periphery 119 of each printer wheel and shaft 118. Manual operation of the interposers 62–66 through the use of the external knobs 78 causes the longitudinal movement of the interposers. This longitudinal movement is translated into rotational movement of the imprinter wheels 117. This rotational motion operates against the spring bias of the fingers 136. The resilient loading of the movable portions of the incisor and imprinter 10 assures that if the device is opened before data set into the device is imprinted upon the tabulating card 105, the interposers and wheels 117 do not revert to their zero value position.

The conventional IBM-type tabulating card is adapted to represent both alphabetic and numeral data. The lower portion of the card contains 80 or 53 columns of ten digital data-representing locations. Adjacent to the upper edge of the card, there is provision for three additional horizontal rows of 80 or 53 data bits each. These rows are referred to as the X, Y and Z rows. By combinations of punches in any one of the X, Y and Z rows, and in any one of the ten numerical data bearing rows of a given column, alphabetical characters are represented on a data bearing card. In situations where only numerical data is to be imprinted and incised upon a tabulating card 105, the X, Y and Z rows will remain blank. In situations of this nature where only numerals are to be represented, it is possible to use a second preferred embodiment of the invention.

Figure 6:
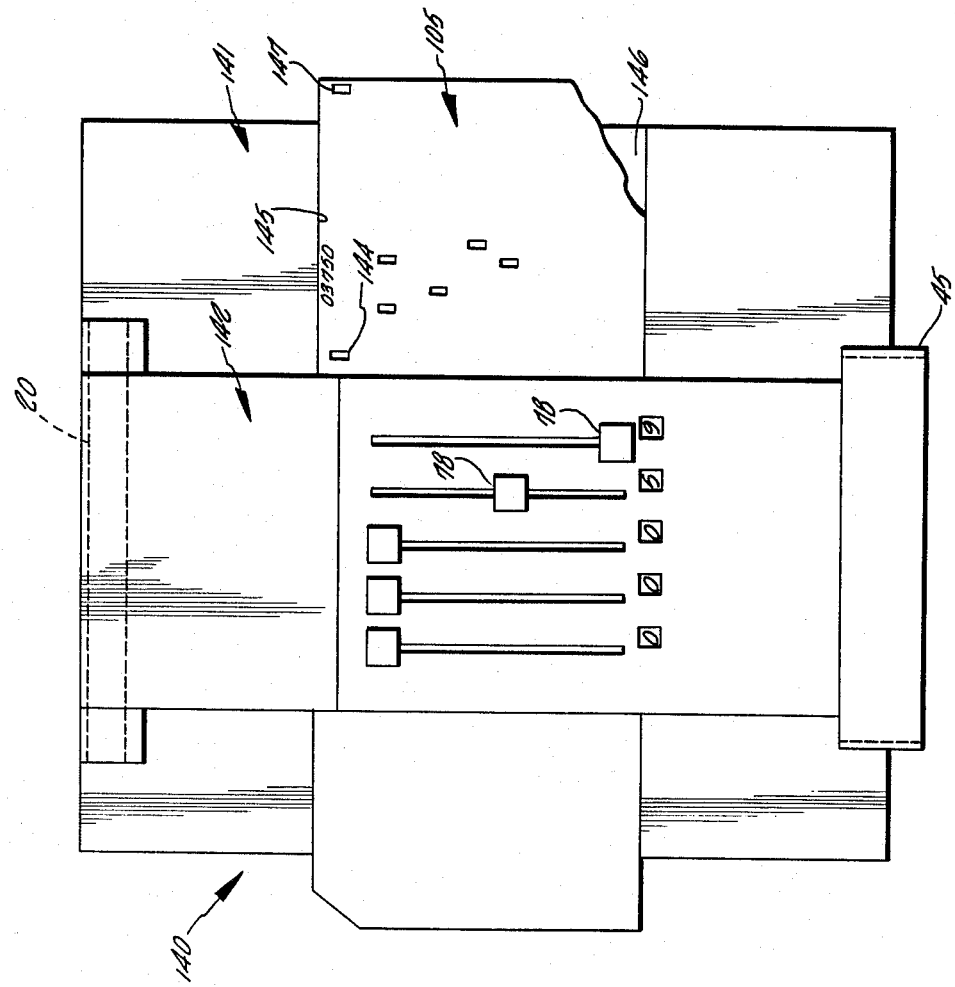
FIGURE 6 is a plan view of a second preferred embodiment of the invention.

Referring to FIGURE 6, a second preferred incisor and imprinter 140 is illustrated. The incisor 140 includes a base 141 and a punch carriage 142. The base 141 includes a punchings catch-pan (not shown) and has ten slots 31 (not shown) formed therein transversely of punch carriage 142. The mechanism of the punch carriage 142 is according to the invention as described above, but in the case of the imprinter and incisor 140 the punch carriage 142 is only hingeably movable about relative to the base 141 and is not slidable along the base.

One or more tabulating card locating projections 144 are raised from the base 141 adjacent the rear edge 145 of a tabulating card recess 146 formed in base 141. Recess 146 is oriented perpendicularly to the longitudinal extent of the punch carriage 142. Locating projections 144 are engageable within apertures 147 formed in the tabulating card 105 in the vicinity of the X, Y and/or Z rows corresponding to the number of projections 144. Preferably only one projection 144 is provided. The card engaging projections 144 are positioned in a precisely predetermined location relative to the group of punches 54 supported within the punch carriage 142. Since in device 140 the punch carriage 142 is merely hingeable and not axially movable of the hinge rod 120, such location of the projections 144 assures that the tabulating card 105 will be positioned in the proper orientation relative to the group of punches 54. This location of guides 144 assures that data selected to be punched into tabulating card 105 by operation of the interposer bar knobs or handles 78 will be punched into the card at exactly the locations dictated for data representation by the hypothetical matrix associated with the tabulating card. Since the guide holes or apertures 147 engageable with the projections 144 are located in the vicinity of the X, Y or Z columns, it is necessary that the apertures 147 be positioned between the normal data bearing locations associated with the X, Y or Z columns when a reading machine is wired to read alpha-numeric data. If the apertures 147 correspond to the positions of apertures normally used to represent alphabetic data, then data processing machines will read a letter a punctuation mark, such as asterisk, rather than a number as was intended. If the apertures 147 are offset relative to the columns of data bearing numerical information, then the brushes in the reading portion of the data processing machinery will not engage the apertures and no signal will be generated.

If a reading machine is wired to read only numeric data, then apertures 147 may be "in-column."

The description of the imprinters and incisors 10 and 140 has been in conjunction with machines adapted for punching numerical data only. It is well within the scope of this invention that additional punches be supported in the punch carriage for the representation of alphabetical information as well as numerical information. A two stage interposer mechanism for selective locking of XYZ punches and a larger diameter imprinter wheel accommodating numerals and letters will accomplish all of the functions assigned to the various elements described above.

The adaptability of the basic printer and incisor provided by this invention into custom tailored devices is an important feature of this invention. In the machinery which operates upon the tabulating cards in the centralized data processing installation, the logical instruction wiring assemblies which instruct these various machines in the operations to be performed may be removed from the machines. For example, in a collator—used to sort and separate cards according to characteristics of various data represented thereon—a wiring panel very similar to an electrical engineer's breadboard is removable as a unit from the collator. This wiring panel is substantially a block of insulation bearing a plurality of female electrical connectors mounted therein. The rear sides of these female connectors contain electrical contacts which are engageable with contacts permanently mounted into the collator. In order to instruct the collator what fields of the cards are to be scanned in searching for a particular card or series of cards, the operator of the device uses jumper wires to connect various ones of the female connectors. This wiring process is referred to as a "functional wiring" process since such wiring of the panel has the effect of instructing the machine as to what functions it is to perform when it is in operation. Many businesses maintain a supply of these wiring panels for each machine in its data processing installation. When a different function is to be performed by the machine the wiring panel previously installed in the board is removed and a second prewired panel is inserted. In view of this ease with which machine functions may be changed, the adaptability and flexibility of the incisor and imprinter of this invention becomes significant. Merely by removing the guide blade 107 associated with the forward portion of the base 11 and installing a second different guide blade, the entire character of operation of the imprinter 10 is modified consistent with a second or alternate data processing program used by the owner of imprinter 10.

In the foregoing discussion, and in the drawings accompanying this description, the invention has been described as including five columns of ten punches 54. This has been by way of example and should not be considered as limiting the invention. It is entirely possible that more or less columns of more or less punches per column may be provided as a part of this invention.

While the foregoing discussion and description of this invention has been made in conjunction with specific apparatus, this has been by way of example and is not to be considered as limiting the scope of this invention.

What is claimed is:
1. Apparatus for incising a blank with data comprising
 (1) a base,
 (2) a punch carriage,
 (3) means on the base engageable with the blank to position the blank in a predetermined fixed position relative to the base,
 (4) a plurality of data punches mounted in the punch carriage and adapted to engage the blank,
 (5) die means movable relative to the punches and to the base normally disposed out of cooperating relation with the punches and underlying the blank when the blank is in its predetermined position relative to the base,
 (6) means in the punch carriage operable for selecting at least one of the plurality of punches and for locking the selected punch into blank incising position,
 (7) means connecting the punch carriage to the base for movement of the carriage toward and away from the base, movement of the carriage toward the base bringing the selected punch into incising engagement with a predetermined area of the blank, and
 (8) means cooperating with the die means operable on movement of the selected punch into said incising engagement to move the die means into cooperating relation with the selected punch.
2. Apparatus according to claim 1 wherein the means on the base engageable with the blank comprises a receptacle configured to engage a portion of the periphery of the blank.

3. Apparatus according to claim 1 wherein the punches define a plurality of columns of punches with an equal number of punches in each column and wherein the means in the punch carriage operable for selecting at least one punch comprises one such means for each column of punches.

4. Apparatus according to claim 1 wherein the blank has an elongate extent and wherein the means connecting the punch carriage and the base comprises a hinge means adapted for movement of the punch carriage relative to the base parallel to the elongate extent of the blank.

5. Apparatus according to claim 4 including means engageable between the base and the punch carriage for aligning the carriage in a preselected location relative to the base whereby the preselected punch incises the blank at a particular location thereof.

6. Apparatus according to claim 1 wherein the blank defines at least one pre-punched locating aperture and wherein the base includes projection means engageable with the pre-punched aperture to position the blank in a predetermined position relative to the base.

7. Apparatus according to claim 6 wherein the means connecting the punch carriage to the base comprises a hinge means.

8. Apparatus for incising a blank tabulating card with data comprising
(1) an elongated base including
  (a) a hinge bar mounted longitudinally of the base,
  (b) a tabulating card recess in a predetermined location on the base oriented parallel to the hinge bar and opening upwardly of the base,
  (c) a locating blade, having at least one punch carriage locating aperture formed therein, oriented parallel to the hinge bar and secured to the base in a predetermined relation to the tabulating card recess, and
(2) a punch carriage hingeably and slidably mounted to the hinge bar, the punch carriage extending laterally of the base and including
  (a) a plurality of punches supported for vertical reciprocation in the punch carriage,
    the punches defining at least one column of punches oriented transversely of the base, the punches being equally spaced from one another and being supported in predetermined positions relative to the tabulating card recess,
  (b) an interposer bar for every column of punches defined by the plurality of punches and mounted in the punch carriage for selective slidable motion longitudinally of the punch carriage,
  (c) a slot longitudinally of the punch carriage for every interposer bar,
  (d) handle means on each interposer bar extending through the slot and engageable for selective sliding of the interposer bar,
  (e) an index aperture though the punch carriage adjacent one end of each longitudinal slot,
  (f) a series of numerals affixed to each interposer bar, at least one of the numerals being visible through the index aperture,
    there being the same number of numerals on each interposer bar as there are punches in each column of punches, the numerals corresponding to predetermined values associated with each of the punches in a column of punches,
  (g) punch lock means on each interposer bar engageable with one of the punches in each column in response to selective sliding of the interposer longitudinally of the punch carriage, engagement of a punch lock means with a punch maintaining the punch in the downward limit of reciprocation relative to the punch carriage, each punch lock means being positioned on its interposer bar whereby the punch engaged by the punch lock means has a value represented by the numeral visible through the index aperture associated with the interposer bar,
  (h) a stripper plate hingeably mounted to the hinge bar and underlying the punch carriage, the stripper plate defining an aperture therethrough adjacent the plurality of punches,
  (i) interconnecting means between the stripper plate and the punch carriage providing limited angular motion of the stripper plate relative to the punch carriage,
  (j) spring means disposed between the punch carriage and the stripper plate normally urging the stripper plate away from the punch carriage,
    the bias of the spring means being sufficient normally to maintain the stripper plate away from the punch carriage when the stripper plate is engaged with the base and the weight of the punch carriage is borne by the spring means,
  (k) a die plate connected to the hinge bar for slidable motion therealong when the punch carriage is slid relative to the hinge bar and to the base,
    the die plate defining a plurality of apertures corresponding in number and configuration to the plurality of punches,
    the die plate being slidably retained by the base and being disposed on the bottom of the tabulating card recess formed in the base, and
  (l) downwardly depending punch carriage location projection means on the punch carriage engageable with at least one punch carriage locating aperture formed in the locating blade whereby the punch carriage is locatable in a preselected position relative to a tabulating card positioned in the tabulating card recess by engagement of the locating projection with the locating aperture.

9. Apparatus for incising and imprinting a blank tabulating card with data comprising
(1) an elongated base including
  (a) a hinge bar mounted longitudinally of the base,
  (b) a tabulating card recess in a predetermined location on the base oriented parallel to the hinge bar and opening upwardly of the base,
  (c) a locating blade, having at least one punch carriage locating aperture formed therein, oriented parallel to the hinge bar and secured to the base in a predetermined relation to the tabulating card recess, and
(2) a punch carriage hingeably and slidably mounted to the hinge bar, the punch carriage extending laterally of the base and including
  (a) a plurality of punches supported for vertical reciprocation in the punch carriage,
    the punches defining at least one column of punches oriented transversely of the base, the punches being equally spaced from one another and being supported in predetermined positions relative to the tabulating card recess,
  (b) an interposer bar for every column of punches defined by the plurality of punches and mounted in the punch carriage for selective slidable motion longitudinally of the punch carriage,
  (c) a slot longitudinally of the punch carriage for every interposer bar,
  (d) handle means on each interposer bar extending through the slot and engageable for selective sliding of the interposer bar, (e) an index aperture through the punch carriage adjacent one end of each longitudinal slot, (f) a series of numerals affixed to each interposer bar, at least one of the numerals being visible through the index aperture, there being the same number of numerals on each interposer bar as there are punches in each column of punches, the numerals corresponding to predetermined values associated with each of the punches in a column of punches, (g) punch lock means on each interposer bar engageable with one of the punches in each column in response to selective sliding of the interposer longitudinally of the punch carriage, engagement of a punch lock means with a punch maintaining the punch in the downward limit of reciprocation relative to the punch carriage, each punch lock means being positioned on its interposer bar whereby the punch engaged by the punch lock means has a value represented by the numeral visible through the index aperture associated with the interposer bar, (h) a stripper plate hingeably mounted to the hinge bar and underlying the punch carriage, the stripper plate defining first and second aperture therethrough, the first aperture being disposed adjacent the plurality of punches and the second aperture being disposed between the first aperture and the hinge bar over the tabulating card recess, (i) interconnecting means between the stripper plate and the punch carriage and providing limited angular motion of the stripper plate away from the punch carriage, (j) spring means disposed between the punch carriage and the stripper plate normally urging the stripper plate away from the punch carriage, the bias of the spring means being sufficient normally to maintain the stripper plate away from the punch carriage when the stripper plate is engaged with the base and the weight of the punch carriage is borne by the spring means, (k) a die plate connected to the hinge bar for slidable motion therealong when the punch carriage is slid relative to the hinge bar and to the base, the die plate defining a plurality of apertures therein corresponding in number and configuration to the plurality of punches, the die plate being slidably retained by the base and being disposed on the bottom of the tabulating card recess formed in the base, (l) downwardly depending punch carriage location projection means on the punch carriage engageable with at least one punch carriage locating aperture formed in the locating blade whereby the punch carriage is locatable in a preselected position relative to the base by engagement of the locating projection with the locating aperture (m) an imprinter wheel for each column of punches rotatably mounted in the punch carriage, (i) each wheel being disposed substantially in line with its associated punch column, (ii) each wheel having a number of printing portions around its periphery, there being the same number of printing portions on each wheel as there are punches in the associated punch column, a selected one of the printing portions projecting through the second stripper plate aperture when the punch carriage is in complete closure relation with the base, (iii) one of a series of numerals formed on each wheel printing portion, and (iv) means interconnected between each imprinter wheel and the interposer bar for the column of punches associated with the wheel providing rotational motion of the wheel upon selective sliding of the interposer whereby the numeral on the printing portion projectable through the stripper plate second aperture corresponds to the value of the punch selectively locked by the interposer, and (n) a printing medium carrier disposed so as to be engageable with the selected wheel printing portion and engageable with a tabulating card located in the tabulating card recess for printing thereon.

10. Apparatus according to claim 9 including spring detent means engageable with each imprinter wheel for maintaining the imprinter wheel and its associated interposer bar in a selected one of a plurality of positions.

11. Apparatus for incising and imprinting a blank tabulating card with data comprising (1) an elongated base including (a) a hinge bar mounted longitudinally of the base, (b) a tabulating card recess in a predetermined location on the base oriented parallel to the hinge bar and opening upwardly of the base, (c) at least one tabulating card locating projection raised from the card recess at a predetermined location in the recess for engagement with apertures pre-punched in preselected locations of a tabulating card positioned in the card recess, (d) a die plate forming a portion of the card recess and defining a plurality of apertures therein corresponding in number and configuration to a plurality of punches, and (2) a punch carriage hingeably mounted to the hinge bar, the punch carriage extending laterally of the base and including (a) a plurality of punches supported for vertical reciprocation in the punch carriage, the punches defining at least one column of punches oriented transversely of the base, the punches of the column of punches being equally spaced from one another and being oriented in predetermined positions relative to the tabulating card recess, (b) an interposer bar for every column of punches defined by the plurality of punches and mounted in the punch carriage for selective slidable motion longitudinally of the punch carriage, (c) a slot longitudinally of the punch carriage for every interposer bar, (d) handle means on each interposer bar extending through the slot and engageable for selective sliding of the interposer bar, (e) an index aperture through the punch carriage adjacent one end of each longitudinal slot, (f) a series of numerals affixed to each interposer bar, at least one of the numerals being visible through the index aperture, there being the same number of numerals on each interposer bar as there are punches in each column of punches, the numerals corresponding to predetermined values associated with each of the punches in a column of punches, (g) punch lock means on each interposer bar engageable with one of the punches in each column in response to selective sliding of the interposer longitudinally of the punch carriage, engagement of a punch lock means with a punch maintaining the punch in the downward limit of reciprocation relative to the punch carriage, the punch lock means being positioned on the interposer bar whereby the punch engaged by the punch lock means has a value represented by the numeral visible through the index aperture associated with the interposer bar, (h) a stripper plate hingeably mounted to the hinge bar and underlying the punch carriage, the stripper plate defining an aperture therethrough adjacent the plurality of punches, (i) interconnecting means between the stripper plate and the punch carriage and providing limited angular motion of the stripper plate away from the punch carriage, and (j) spring means disposed between the punch carriage and the stripper plate normally urging the stripper plate away from the punch carriage.

12. Apparatus for incising a blank with data comprising
(1) means for holding a blank,
(2) a plurality of blank punches,
(3) means for preselecting at least one of the punches for incising engagement with the blank,
(4) die means disposed adjacent the blank opposite from the plurality of punches,
   the die means being movable relative to the blank, the die means being biased into a normal position out of cooperating engagement with the punches,
(5) means for moving the preselected punch and the blank into incising engagement, and
(6) means cooperating with the die means on movement of the preselected punch into incising engagement with the blank to move the die means from its normal position into incising engagement with the preselected punch.

13. Apparatus for incising a blank with data comprising
(1) a base,
(2) a punch carriage,
(3) means on the base engageable with the blank to position the blank in a predetermined position relative to the base,
(4) a plurality of data punches mounted in the punch carriage and adapted to engage the blank,
(5) die means movably supported by the base cooperating with the punches and underlying the blank when the blank is in its predetermined position relative to the base,
(6) punch selecting means in the punch carriage operable for selecting at least one of the plurality of punches and for locking the selected punch into blank incising position,
(7) means engageable with the die means for aligning the die means with the selected punch,
(8) means connecting the punch carriage to the base for movement of the carriage toward and away from the base, movement of the carriage toward the base bringing the selected punch into incising engagement with a predetermined area of the blank,
(9) imprinting means operable in response to operation of the punch selecting means to imprint the blank with data corresponding in value to the punch selected by operation of the punch selecting means, and
(10) means in the carriage engaging the imprinting means for maintaining the imprinting means and the punch selecting means in a selected operable relation to the selected punch.

14. Apparatus for incising a blank with data comprising
(1) a base,
(2) a punch carriage,
(3) means on the base engageable with the blank to position the blank in a predetermined position relative to the base,
(4) a plurality of data punches mounted in the punch carriage and adapted to engage the blank,
(5) die means cooperating with the punches and underlying the blank when the blank is in its predetermined position relative to the base,
(6) means in the punch carriage operable for selecting at least one of the plurality of punches and for locking the selected punch into blank incising position,
(7) means for connecting the punch carriage to the base for movement of the carriage toward and away from the base and for connecting the punch carriage and the die means to the base for movement of the carriage and die means longitudinally relative to said predetermined position, movement of the carriage toward the base bringing the selected punch into incising engagement with a predetermined area of the blank, the die means moving underneath a blank positioned relative to the base.

15. Apparatus for incising a blank with data comprising
(1) a base,
(2) a punch carriage,
(3) means on the base engageable with the blank to position the blank in a predetermined position relative to the base,
(4) a plurality oof data punches mounted in the punch carriage and adapted to engage the blank,
(5) die means cooperating with the punches and laterally movably engaged with the base and underlying the blank when the blank is in its predetermined position relative to the base,
(6) means in the punch carriage operable for selecting at least one of the plurality of punches and for locking the selected punch into blank incising position,
(7) means connecting the punch carriage to the base for movement of the carriage toward and away from the base, movement of the carriage toward the base bringing the selected punch into incising engagement with a predetermined area of the blank, and
(8) means engaging the die means upon movement of the selected punch into said incising engagement to align the die means with the selected punch.

16. Apparatus for incising a blank with data comprising
(1) a base,
(2) a punch carriage,
(3) means on the base engageable with the blank to position the blank in a predetermined position relative to the base,
(4) a plurality of data punches mounted in the punch carriage and adapted to engage the blank,
(5) die means cooperating with the punches and laterally movably engaged with the base and underlying the blank when the blank is in its predetermined position relative to the base,
(6) means in the punch carriage operable for selecting at least one of the plurality of punches and for locking the selected punch into blank incising position,
(7) means connecting the punch carriage to the base for movement of the carriage toward and away from the base, movement of the carriage toward the base bringing the selected punch into incising engagement with a predetermined area of the blank,
(8) means engaging the die means upon movement of the selected punch into said incising engagement to align the die means with the selected punch, and
(9) punch stripper means mounted to the carriage for moving the blank relative to the selected punch as the carriage is moved away from the base.

17. Apparatus for incising a blank with data comprising
(1) a base,
   (a) a blank receiving means configured to engage the blank and position the blank in a preselected location on the base
  (b) a plurality of parallel punch recesses in the base disposed below a blank positioned on the base,
(2) a punch carriage hingeably connected to the base and extending across a blank positioned on the base,
  (a) a plurality of reciprocable punches supported in the carriage,
    (i) the punches defining at least one column of punches,
    (ii) each column comprised of a number of punches equal to the number of punch recesses in the base,
    (iii) each punch in the column being aligned with a respective punch recess when the carriage is disposed across the blank on the base,
  (b) punch selecting means in the carriage operable for selecting at least one punch and for locking the selected punch into blank incising position,
(3) die means disposed between the carriage and the base transversely of the blank positioned on the base and underlying the blank and overlying the punch recesses,
  (a) a plurality of punch receiving apertures corresponding to the plurality of punches and formed in the die means,
  (b) the die means normally being disposed with the punch receiving apertures out of engagement with the punches, and
(4) means cooperating between the die means and the carriage for urging the die means into a position wherein the punch receiving apertures are aligned with the punches when the carriage is hinged relative to the base to incise a blank.

References Cited in the file of this patent
UNITED STATES PATENTS

| | | |
|---|---|---|
| 1,266,230 | Dosch | May 14, 1918 |
| 1,430,014 | Hyman | Sept. 26, 1922 |
| 1,827,180 | Williams | Oct. 13, 1931 |